United States Patent
Zhang et al.

(10) Patent No.: US 11,616,226 B2
(45) Date of Patent: Mar. 28, 2023

(54) METHOD FOR PREPARING HIGH-VOLTAGE CATHODE MATERIAL BY BODY MODIFICATION AND REGENERATION OF WASTE LITHIUM COBALTATE MATERIAL

(71) Applicant: KUNMING UNIVERSITY OF SCIENCE AND TECHNOLOGY, Kunming (CN)

(72) Inventors: Yingjie Zhang, Kunming (CN); Peng Dong, Kunming (CN); Qi Meng, Kunming (CN); Siyuan Zhou, Kunming (CN); Qingxiang Li, Kunming (CN); Shaoqiang Zhou, Kunming (CN); Jianguo Duan, Kunming (CN); Xue Li, Kunming (CN); Yin Liu, Kunming (CN); Duanyun Chen, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 188 days.

(21) Appl. No.: 17/232,241

(22) Filed: Apr. 16, 2021

(65) Prior Publication Data
US 2021/0391568 A1    Dec. 16, 2021

(30) Foreign Application Priority Data
Jun. 10, 2020    (CN) .......................... 202010526116.4

(51) Int. Cl.
*H01M 4/36* (2006.01)
*C01G 51/00* (2006.01)
(Continued)

(52) U.S. Cl.
CPC ............ *H01M 4/366* (2013.01); *C01G 51/66* (2013.01); *H01M 4/525* (2013.01);
(Continued)

(58) Field of Classification Search
CPC .. H01M 10/0525; H01M 10/54; H01M 4/525; H01M 4/58; H01M 4/5825;
(Continued)

(56) References Cited

U.S. PATENT DOCUMENTS

| 6,835,228 B1 * | 12/2004 | Lin | C22B 23/0453 |
| | | | 423/100 |
| 2011/0147679 A1 * | 6/2011 | Inukai | H01M 4/1391 |
| | | | 423/625 |

(Continued)

FOREIGN PATENT DOCUMENTS

| CN | 108258351 A | 7/2013 |
| CN | 109119711 A | 1/2019 |
| CN | 110010991 A | 7/2019 |

*Primary Examiner* — Brian K Talbot
(74) *Attorney, Agent, or Firm* — RatnerPrestia

(57) ABSTRACT

The disclosure discloses a method for preparing a high-voltage cathode material by body modification and regeneration of a waste lithium cobaltate material. The waste lithium cobaltate cathode material is calcined, and then measured; a lithium source, a magnesium source, nano-scale $TiO_2$ and the waste lithium cobaltate cathode material powder are mixed to obtain a mixture, placed in a ball milling tank containing absolute ethanol, and the resulting mixture is ball milled, and then dried to obtain a mixed powder; the mixed powder is calcined to obtain a magnesium-titanium co-doped regenerated lithium cobaltate cathode material; the magnesium-titanium co-doped regenerated lithium cobaltate cathode material is added into a mixed solution obtained by ultrasonically mixing absolute ethanol with the aluminum source, and then heated and stirred continually until the solvent evaporates to obtain a residue; the residue is calcined to obtain an aluminum-coated magnesium-titanium co-doped regenerated lithium cobaltate cathode material.

10 Claims, 4 Drawing Sheets

(51) Int. Cl.
*H01M 4/525* (2010.01)
*H01M 10/052* (2010.01)
*H01M 10/54* (2006.01)
*H01M 4/02* (2006.01)
*H01M 4/58* (2010.01)

(52) U.S. Cl.
CPC ......... *H01M 10/052* (2013.01); *H01M 10/54* (2013.01); *C01G 51/00* (2013.01); *C01G 51/42* (2013.01); *C01P 2002/72* (2013.01); *C01P 2002/76* (2013.01); *C01P 2004/03* (2013.01); *C01P 2006/40* (2013.01); *H01M 4/58* (2013.01); *H01M 4/5825* (2013.01); *H01M 2004/028* (2013.01); *Y02E 60/10* (2013.01); *Y02W 30/84* (2015.05)

(58) Field of Classification Search
CPC ..... C01P 2004/03; C01G 51/00; C01G 51/42; C01G 51/66; Y02E 60/10; Y02W 30/84
USPC .................................................. 427/123, 212
See application file for complete search history.

(56) References Cited

U.S. PATENT DOCUMENTS

2013/0323142 A1* 12/2013 Shimano ............. H01M 4/0471
423/49
2019/0152797 A1* 5/2019 Liu ...................... B01D 9/0031
2020/0358148 A1* 11/2020 Dong .................... H01M 4/505

* cited by examiner

METHOD FOR PREPARING HIGH-VOLTAGE CATHODE MATERIAL BY BODY MODIFICATION AND REGENERATION OF WASTE LITHIUM COBALTATE MATERIAL

CROSS REFERENCE TO RELATED APPLICATION

This application claims the priority of Chinese Patent Application No. 202010526116.4, entitled "Method for preparing high-voltage cathode material by body modification and regeneration of waste lithium cobaltate material" filed with the China National Intellectual Property Administration on Jun. 10, 2020, which is incorporated herein by reference in its entirety.

TECHNICAL FIELD

The disclosure relates to the field of recycling and reusing of waste lithium-ion batteries, in particular to a method for preparing a high-voltage cathode material by body modification and regeneration of a waste lithium cobaltate material.

BACKGROUND ART

Lithium-ion batteries are widely used in portable electronic equipment, electric vehicles and other fields because of the advantages of their high energy density, stable cycle, long life, and no memory effect. Increasing the demand for lithium-ion batteries, waste lithium-ion batteries after cycle failure also increases at a remarkable speed. According to data published by the London research organization "Circular Energy Storage", the amount of the waste lithium-ion batteries can reach to 1.2 million tons by 2030. The waste lithium-ion battery contains many harmful substances, which could cause environmental pollution, resource waste and damage to human health if they are not treated appropriately. Therefore, there is an urgent need for efficient and scientific recycling of waste lithium-ion batteries.

Lithium cobaltate cathode material having the advantages of high theoretical specific capacity, large volume energy density, good cycle performance and the like plays a dominant role in the 3C electronic product market since the lithium cobaltate cathode material is commercialized. With the promotion of 5G technology, the lithium cobaltate battery has an increased demand day by day, at the same time, produces a waste with an underestimated amount. At present, the recycling method of waste lithium cobaltate batteries mainly includes pyrometallurgy, hydrometallurgy and direct regeneration. Among them, the direct regeneration can convert the waste lithium cobaltate cathode material into a reusable cathode material through a series of treatments, which can not only shorten the recycling process, but also has greater economic benefits and has a broader application prospect. CN108258351 A disclosed that a regenerated lithium cobaltate material is obtained by preparing precipitations of cobalt(II) oxalate dihydrate and lithium carbonate from a solution containing lithium and a solution containing cobalt, and mixing and calcining the precipitations. CN110010991 A disclosed that a waste lithium cobaltate material is regenerated through a sol-gel method. Although the above two methods enable regeneration of the lithium cobaltate cathode material, they both use acid solutions that pollute the environment, and can only regenerate the lithium cobaltate material at normal pressure level.

With the improvement of the performance requirements of screen, standby time and quality of the portable electronic equipment, the energy density of lithium cobaltate material needs to be continuously increased. Taking into account the recycling of waste lithium cobaltate cathode materials and improving energy density, CN109119711 A disclosed that the surface of regenerated lithium cobaltate particles is coated with lithium-rich manganese-based materials, improving the high-voltage performance of regenerated lithium cobaltate materials. Although the coating modification makes it possible to improve the interface stability of the material, the internal structural stability of regenerated lithium cobaltate materials remain to be solved.

SUMMARY OF THE INVENTION

In view of the shortcomings of the existing technology for recycling the waste lithium cobaltate cathode material, the present disclosure provides a method for preparing a high-voltage cathode material by body modification and regeneration of a waste lithium cobaltate material, aiming to efficiently recover the waste lithium cobaltate cathode material and prepare a lithium cobaltate high-voltage cathode material with excellent performance.

A method for preparing a high-voltage cathode material by body modification and regeneration of a waste lithium cobaltate material, including, (1) soaking the waste lithium cobaltate battery completely in a solution with a concentration of sodium chloride of 1 to 3 mol/L for 24 to 48 hours, disassembling manually and peeling off the waste lithium cobaltate battery to obtain a waste lithium cobaltate cathode sheet, soaking completely the waste lithium cobaltate cathode sheet in a solution with a concentration of sodium hydroxide of 1 to 3 mol/L, stirring and reacting for 5 to 15 hours, filtering and washing to obtain a waste lithium cobaltate cathode material, and calcining the waste lithium cobaltate cathode material in a muffle furnace at a temperature of 500 to 700° C. for 2 to 5 hours, to obtain a waste lithium cobaltate cathode material powder; measuring the content of Li and Co thereof;

(2) mixing a lithium source, a magnesium source, nanoscale $TiO_2$ and the waste lithium cobaltate cathode material powder to obtain a mixture, placing the mixture into a ball mill tank, adding absolute ethanol acting as a dispersing agent, and ball milling the mixture, and then drying the mixture in a blast drying oven, to obtain a mixed powder;

(3) placing the mixed powder in a muffle furnace, calcining the mixed powder in an air atmosphere to obtain a magnesium-titanium co-doped regenerated lithium cobaltate cathode material;

(4) ultrasonically mixing absolute ethanol and an aluminum source for 30 minutes to obtain a mixed solution, adding the magnesium-titanium co-doped regenerated lithium cobaltate cathode material into the mixed solution, heating and stirring continually until the solvent in the mixed solution evaporates to obtain a residue; and (5) calcining the residue in a muffle furnace to obtain an aluminum-coated magnesium-titanium co-doped regenerated lithium cobaltate cathode material.

In step (2), the lithium source is lithium carbonate or lithium hydroxide; the magnesium source is magnesium oxide or magnesium hydroxide.

In the mixture of step (2), a molar ratio of Co:Mg:Ti is in a range of (0.9-0.98):(0.01-0.05):(0.01-0.05), and a molar ratio of Li:M is in a range of (1.03-1.1):1, with the proviso that M=Mg+Ti+Co, i.e. the sum of the molar amounts of the three.

In step (2), the ball milling is performed in a mass ratio of ball-to-material of 5:1 to 15:1, and is performed at a ball milling rate of 100-300 r/min for 0.5-2 hours; absolute ethanol acting as a dispersing agent is added to reach ⅔ height of the ball mill tank.

In step (2), the drying is performed at a temperature of 90-150° C. for 10-20 hours.

In step (3), the calcining is performed at a temperature of 800-1100° C. for 10-20 hours.

In step (4), the aluminum source is aluminium isopropoxide or aluminum tri-sec-butoxide; a mass-volume ratio of the aluminum source to absolute ethanol is in a range of (0.08-4) g:1000 mL.

In step (4), a mass-volume ratio of the magnesium-titanium co-doped regenerated lithium cobaltate cathode material to the mixed solution is in a range of (0.02-0.04) g:1 mL.

In step (4), the heating and stirring are performed at a temperature of 40-70° C.

In step (5), the calcining is performed at a temperature of 600-900° C. for 2-6 hours.

The present disclosure modifies the body phase of the waste lithium cobaltate cathode material for the first time to prepare a high-voltage-resistant regenerated lithium cobaltate cathode material.

The disclosure provides an environmentally-friendly and efficient method for recycling waste lithium cobaltate materials without using acid, alkali and other harmful substances and is simple in operation.

The regenerated lithium cobaltate cathode material prepared by the method according to the present disclosure has a stable interface and internal structure, is suitable for high-voltage conditions, and improves the additional utilization value of the product.

The method of the disclosure is simple in operation, pollution-free, has significant economic benefits, and makes it possible to simultaneously realize the regeneration of the waste lithium cobaltate material and the preparation of the high-voltage cathode material, and provide a new idea for the recycling and reusing of the waste lithium cobaltate cathode material, which has huge application prospects.

DETAILED DESCRIPTION OF THE EMBODIMENTS

The present disclosure will be further described below in conjunction with embodiments and drawings.

Example 1

Figure 1:
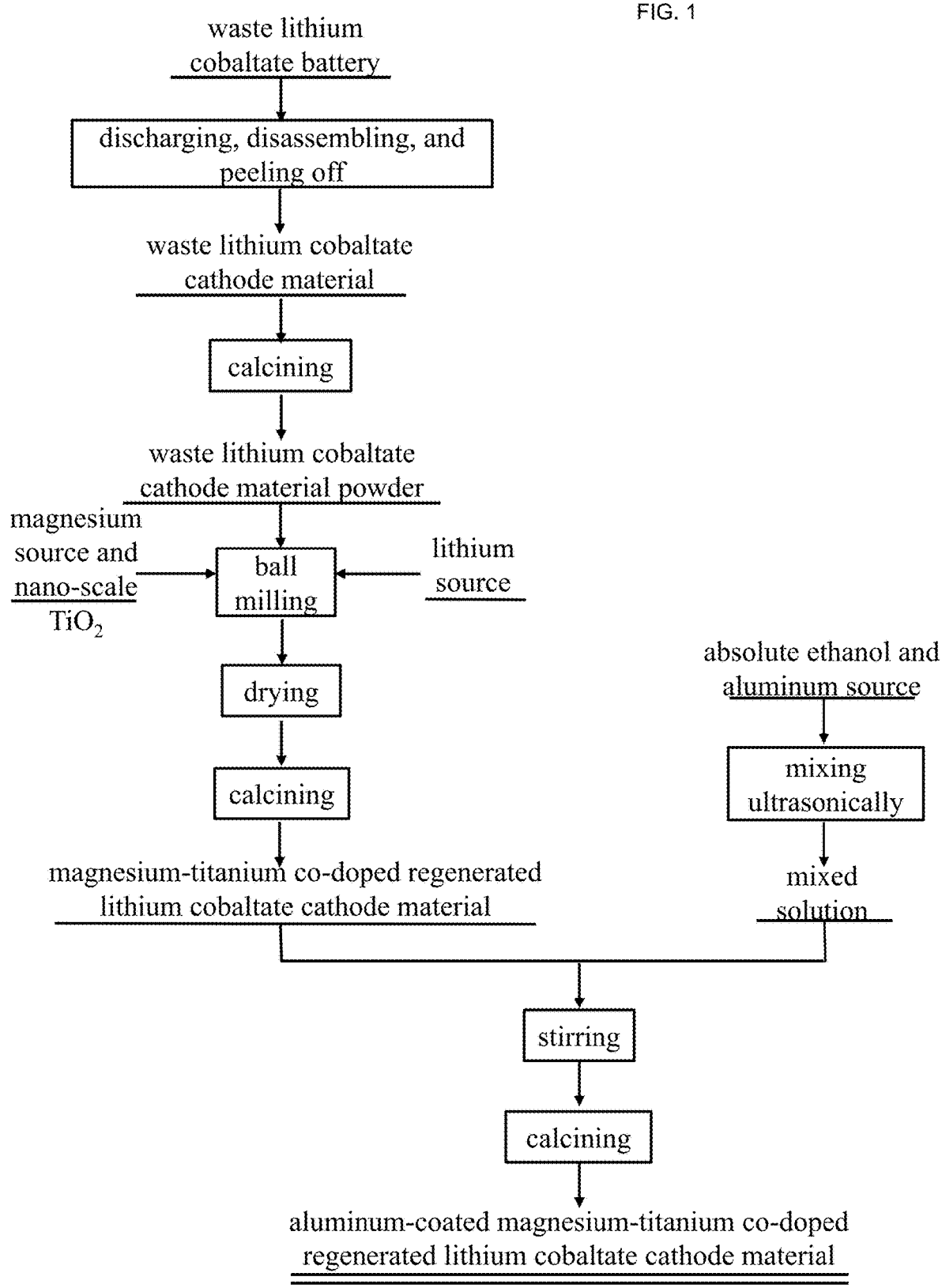
FIG. 1 shows a process flow diagram of Example 1 of the present disclosure.

A method for preparing a high-voltage cathode material by body modification and regeneration of a waste lithium cobaltate material, as shown in FIG. 1, specifically including the following steps:

(1) a waste lithium cobaltate battery was completely soaked in a solution with a concentration of sodium chloride of 2 mol/L for 36 hours, then the waste lithium cobaltate battery was manually disassembled and peeled off to obtain a waste lithium cobaltate cathode sheet, then the waste lithium cobaltate cathode sheet was completely soaked in a solution with a concentration of sodium hydroxide of 1.5 mol/L, and stirred and reacted for 10 hours, the resulting mixture was filtered, and the filter cake was washed to obtain a waste lithium cobaltate cathode material; the waste lithium cobaltate cathode material was placed in a muffle furnace and calcined at 650° C. for 3 hours under an air atmosphere to obtain a waste lithium cobaltate cathode material powder; the contents of Li and Co in the obtained waste lithium cobaltate cathode material powder were measured;

(2) lithium carbonate, magnesium oxide and nano-scale $TiO_2$ provided according to the contents of Li and Co and the waste lithium cobaltate cathode material powder were mixed to obtain a mixture, wherein in the mixture, a molar ratio of Li:M (M=Mg+Ti+Co) was 1.03:1, and a molar ratio of Co:Mg:Ti was 0.98:0.01:0.01; the mixture was placed into a ball mill tank, absolute ethanol as a dispersing agent was added to reach ⅔ height of the ball mill tank, and the resulting mixture was subjected to a ball milling, wherein the ball milling was performed in a mass ratio of ball-to-material of 5:1, and at a ball milling rate of 200 r/min for 1 hour. After the ball milling was completed, the mixture was dried in a blast drying oven at 100° C. for 15 hours to obtain a mixed powder;

(3) the mixed powder was placed in a muffle furnace and calcined at a temperature of 800° C. for 20 hours in an air atmosphere, to obtain a magnesium-titanium co-doped regenerated lithium cobaltate cathode material;

(4) aluminum isropoxide and absolute ethanol were ultrasonically mixed for 30 minutes with a mass-volume ratio of 4 g:1000 mL to obtain a mixed solution; the magnesium-titanium co-doped regenerated lithium cobaltate cathode material was added into the mixed solution with a mass-volume ratio of 0.04 g:1 mL, and the resulting mixture was heated and stirred at a temperature of 40° C. until the solvent in the mixed solution evaporates to obtain a residue; and (5) the residue was calcined in a muffle furnace under an air atmosphere at a temperature of 750° C. for 5 hours, to obtain an aluminum-coated magnesium-titanium co-doped regenerated lithium cobaltate cathode material.

Figure 2:
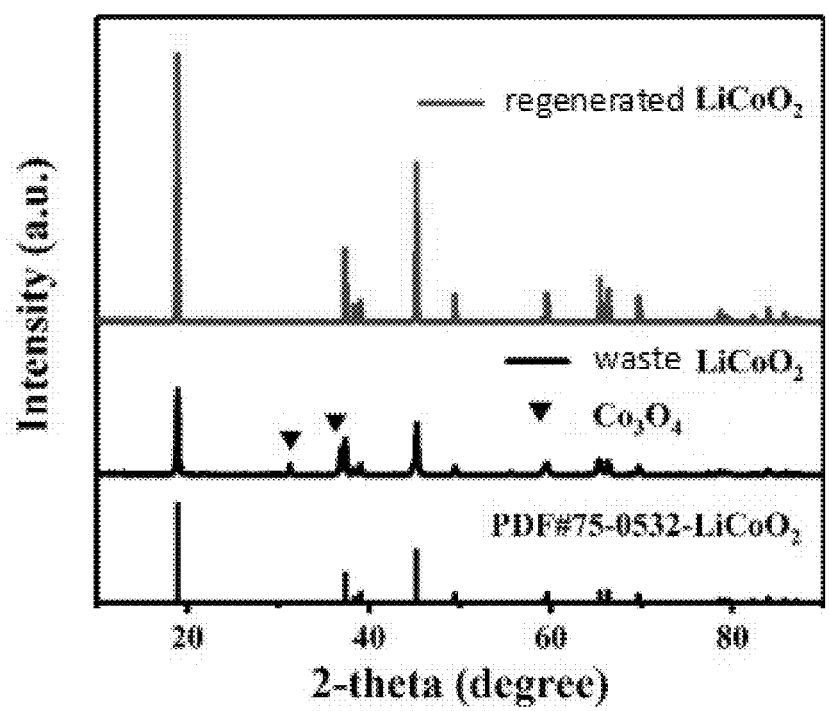
FIG. 2 shows an XRD (Diffraction of X-rays) diagram of the waste lithium cobaltate cathode material and the prepared regenerated lithium cobaltate cathode material in Example 1 of the present disclosure.

FIG. 2 shows the XRD diagram of the waste lithium cobaltate cathode material and the prepared regenerated lithium cobaltate material in Example 1. As can be seen from FIG. 2, the waste lithium cobaltate cathode material and the regenerated lithium cobaltate cathode material both belong to the R-3m space group, have a layered hexagonal structure, while the regenerated lithium cobaltate cathode material does not contain $Co_3O_4$ impurity phase, shows good crystallinity, and has effectively repaired crystal structures.

Example 2

A method for preparing a high-voltage cathode material by body modification and regeneration of a waste lithium cobaltate material, specifically including the following steps:

(1) a waste lithium cobaltate battery was completely soaked in a solution with a concentration of sodium chloride of 1 mol/L for 48 hours, then the waste lithium cobaltate battery was manually disassembled and peeled off to obtain a waste lithium cobaltate cathode sheet, then the waste lithium cobaltate cathode sheet was completely soaked in a solution with a concentration of sodium hydroxide of 3 mol/L, and stirred and reacted for 5 hours, the resulting mixture was filtered, and the filter cake was washed to obtain a waste lithium cobaltate cathode material; the waste lithium cobaltate cathode material was placed in a muffle furnace and calcined at 500° C. for 5 hours under an air atmosphere to obtain a waste lithium cobaltate cathode material powder; the contents of Li and Co in the obtained waste lithium cobaltate cathode material powder were measured;

(2) lithium hydroxide powder, magnesium hydroxide powder and nano-scale $TiO_2$ provided according to the contents of Li and Co and the waste lithium cobaltate cathode material powder were mixed to obtain a mixture, wherein in the mixture, a molar ratio of Li:M (M=Mg+Ti+Co) was 1.08:1, and a molar ratio of Co:Mg:Ti was 0.94:0.04:0.02; the mixture was placed into a ball mill tank, absolute ethanol as a dispersing agent was added to reach ⅔ height of the ball mill tank, and the resulting mixture was subjected to a ball milling, wherein the ball milling is performed in a mass ratio of ball-to-material of 10:1, and at a ball milling rate of 100 r/min for 2 hours. After the ball milling is completed, the mixture was dried in a blast drying oven at 90° C. for 20 hours to obtain a mixed powder;

(3) the mixed powder was placed in a muffle furnace and calcined at a temperature of 1000° C. for 12 hours in an air atmosphere, to obtain a magnesium-titanium co-doped regenerated lithium cobaltate cathode material;

(4) aluminum tri-sec-butoxide and absolute ethanol were ultrasonically mixed for 30 minutes with a mass-volume ratio of 0.08 g:1000 mL to obtain a mixed solution; the magnesium-titanium co-doped regenerated lithium cobaltate cathode material was added into the mixed solution with a mass-volume ratio of 0.02 g:1 mL, and the resulting mixture was heated and stirred at a temperature of 70° C. until the solvent in the mixed solution evaporates to obtain a residue; and (5) the residue was calcined in a muffle furnace under an air atmosphere at a temperature of 600° C. for 6 hours, to obtain an aluminum-coated magnesium-titanium co-doped regenerated lithium cobaltate cathode material.

Figure 3:
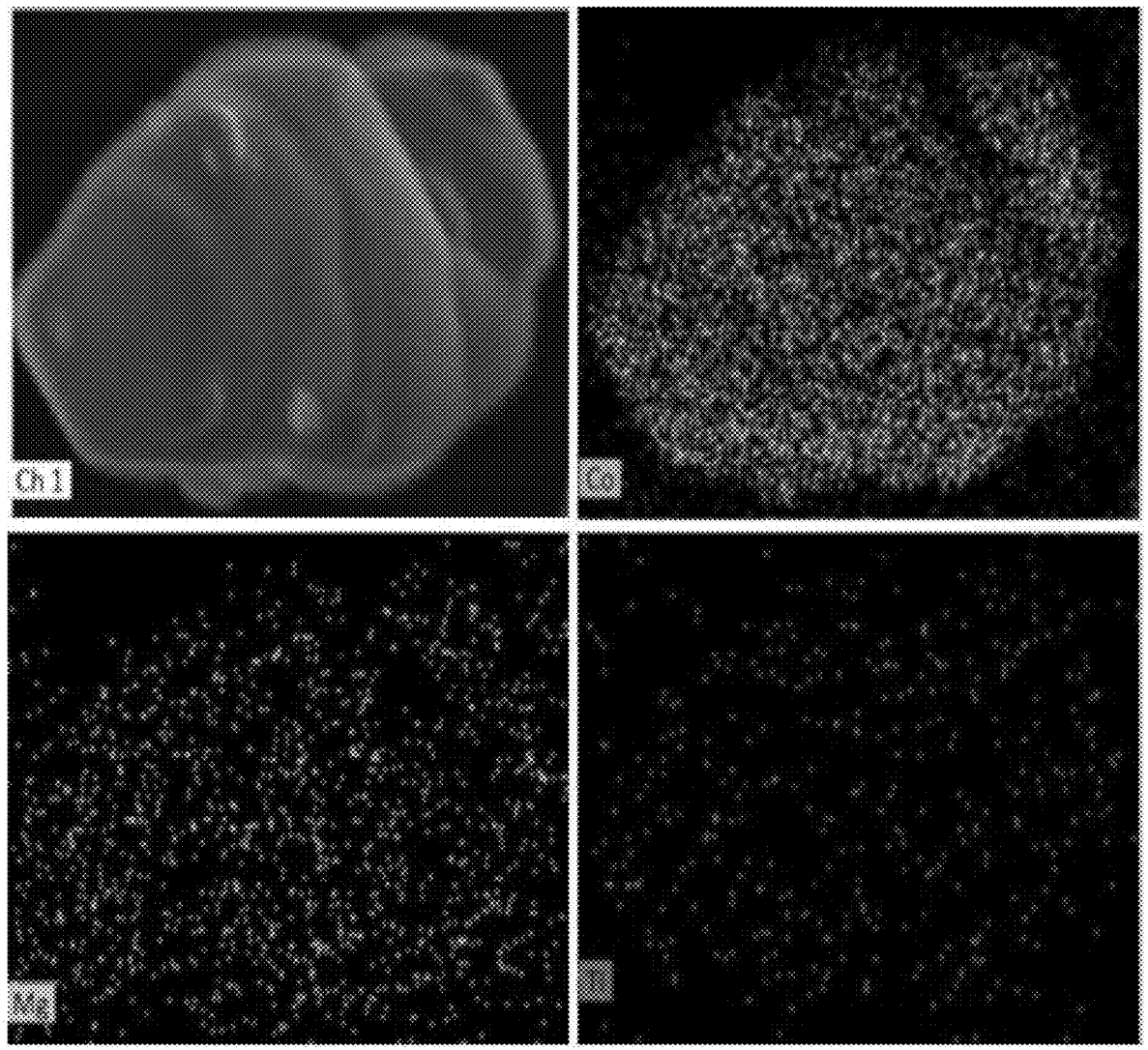
FIG. 3 shows an EDS (Energy Dispersive Spectroscopy) diagram of the magnesium-titanium co-doped regenerated lithium cobaltate cathode material as prepared in Example 2 of the present disclosure.

FIG. 3 shows the EDS diagram of the magnesium-titanium co-doped regenerated lithium cobaltate cathode material prepared in Example 2. As can be seen from FIG. 3, cobalt, magnesium and titanium are evenly distributed in the cathode material obtained after ball milling and calcining of waste lithium cobaltate cathode material powder.

Example 3

A method for preparing a high-voltage cathode material by body modification and regeneration of a waste lithium cobaltate material, specifically including the following steps:

(1) a waste lithium cobaltate battery was completely soaked in a solution with a concentration of sodium chloride of 3 mol/L for 24 hours, then the waste lithium cobaltate battery was manually disassembled and peeled off to obtain a waste lithium cobaltate cathode sheet, then the waste lithium cobaltate cathode sheet was completely soaked in a solution with a concentration of sodium hydroxide of 1 mol/L, and stirred and reacted for 15 hours, the resulting mixture was filtered, and the filter cake was washed to obtain a waste lithium cobaltate cathode material; the waste lithium cobaltate cathode material was placed in a muffle furnace and calcined at 700° C. for 2 hours under an air atmosphere to obtain a waste lithium cobaltate cathode material powder; the contents of Li and Co in the obtained waste lithium cobaltate cathode material powder were measured;

(2) lithium carbonate, magnesium oxide and nano-scale $TiO_2$ provided according to the contents of Li and Co and the waste lithium cobaltate cathode material powder were mixed to obtain a mixture, wherein in the mixture, a molar ratio of Li:M (M=Mg+Ti+Co) was 1.1:1, and a molar ratio of Co:Mg:Ti was 0.9:0.05:0.05; the mixture was placed into a ball mill tank, absolute ethanol as a dispersing agent was added to reach ⅔ height of the ball mill tank, and the resulting mixture was subjected to a ball milling, wherein the ball milling is performed in a mass ratio of ball-to-material of 15:1, and at a ball milling rate of 300 r/min for 0.5 hours. After the ball milling is completed, the mixture was dried in a blast drying oven at 150° C. for 10 hours to obtain a mixed powder;

(3) the mixed powder was placed in a muffle furnace and calcined at a temperature of 1100° C. for 10 hours in an air atmosphere, to obtain a magnesium-titanium co-doped regenerated lithium cobaltate cathode material;

(4) aluminum isopropoxide and absolute ethanol were ultrasonically mixed for 30 minutes with a mass-volume ratio of 0.5 g:1000 mL to obtain a mixed solution; the magnesium-titanium co-doped regenerated lithium cobaltate cathode material was added into the mixed solution with a mass-volume ratio of 0.025 g:1 mL, and the resulting mixture was heated and stirred at a temperature of 60° C. until the solvent in the mixed solution evaporates to obtain a residue; and (5) the residue was calcined in a muffle furnace under an air atmosphere at a temperature of 900° C. for 2 hours, to obtain an aluminum-coated magnesium-titanium co-doped regenerated lithium cobaltate cathode material.

Figure 4:
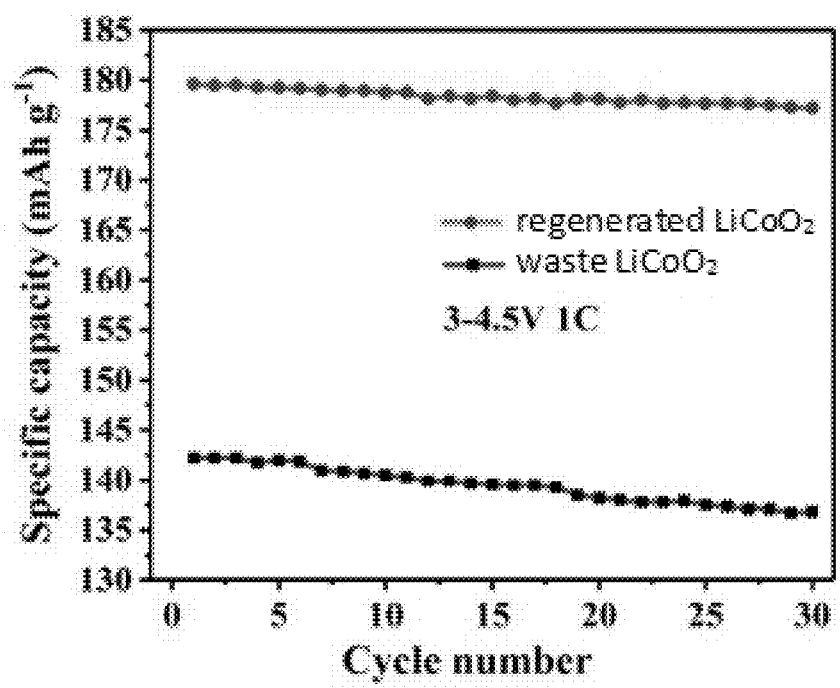
FIG. 4 shows a 1C cycle performance curve of the waste lithium cobaltate cathode material and the prepared regenerated lithium cobaltate cathode material in Example 3 of the present disclosure.

As shown in FIG. 4, the electrochemical performance of the waste lithium cobaltate cathode material and the regenerated lithium cobaltate cathode material in the half-cell (3-4.5V) were evaluated. The specific discharge capacity of the waste lithium cobaltate cathode material and the regenerated lithium cobaltate cathode material in the first cycle at 1C (1C=150 mAh·g$^{-1}$) is 142.2 mAh·g$^{-1}$ and 179.62 mAh·g$^{-1}$ respectively; after 30 cycles, the capacity retention rate of the regenerated lithium cobaltate cathode material is 98.69%, while that of the waste lithium cobaltate cathode material is 96.2%.

The present application describes the process method of the disclosure by the above-mentioned examples, but is not limited to the above-mentioned process steps. Those skilled in the art should understand that the equivalent replacement of the raw materials selected, the addition of auxiliary components, and the choice of the specific manners in the present disclosure all fall within the scope of protection and disclosure of the present disclosure.

What is claimed is:

1. A method for preparing a high-voltage cathode material by body modification and regeneration of a waste lithium cobaltate material, including, (1) soaking a waste lithium cobaltate battery in a solution with a concentration of sodium chloride of 1 to 3 mol/L for 24 to 48 hours, disassembling and peeling off the waste lithium cobaltate battery to obtain a waste lithium cobaltate cathode sheet, soaking completely the waste lithium cobaltate cathode sheet in a solution with a concentration of sodium hydroxide of 1 to 3 mol/L, stirring and reacting for 5 to 15 hours, filtering and washing to obtain a waste lithium cobaltate cathode material, calcining the waste lithium cobaltate cathode material at a temperature of 500 to 700° C. for 2 to 5 hours, to obtain a waste lithium cobaltate cathode material powder; measuring the contents of Li and Co thereof;

(2) mixing a lithium source, a magnesium source, nano-scale $TiO_2$ and the waste lithium cobaltate cathode material powder to obtain a mixture, placing the mixture into a ball mill tank, adding absolute ethanol thereto, ball milling the mixture, and drying, to obtain a mixed powder;

(3) calcining the mixed powder in an air atmosphere, to obtain a magnesium-titanium co-doped regenerated lithium cobaltate cathode material;

(4) ultrasonically mixing absolute ethanol and an aluminum source for 30 minutes to obtain a mixed solution, adding the magnesium-titanium co-doped regenerated lithium cobaltate cathode material into the mixed solution, heating and stirring continually until the solvent in the mixed solution evaporates to obtain a residue; and (5) calcining the residue, to obtain an aluminum-coated magnesium-titanium co-doped regenerated lithium cobaltate cathode material.

2. The method for preparing a high-voltage cathode material by body modification and regeneration of a waste lithium cobaltate material according to claim 1, wherein in step (2), the lithium source is lithium carbonate or lithium hydroxide; the magnesium source is magnesium oxide or magnesium hydroxide.

3. The method for preparing a high-voltage cathode material by body modification and regeneration of a waste lithium cobaltate material according to claim 1, wherein in the mixture of step (2), a molar ratio of Co:Mg:Ti is in a range of (0.9-0.98):(0.01-0.05):(0.01-0.05), and a molar ratio of Li:M is in a range of (1.03-1.1):1, with the proviso that M=Mg+Ti+Co.

4. The method for preparing a high-voltage cathode material by body modification and regeneration of a waste lithium cobaltate material according to claim 1, wherein in step (2), the ball milling is performed in a mass ratio of ball-to-material of 5:1 to 15:1, and is performed at a ball milling rate of 100-300 r/min for 0.5-2 hours; absolute ethanol is added to reach ⅔ height of the ball mill tank.

5. The method for preparing a high-voltage cathode material by body modification and regeneration of a waste lithium cobaltate material according to claim 1, wherein in step (2), the drying is performed at a temperature of 90-150° C. for 10-20 hours.

6. The method for preparing a high-voltage cathode material by body modification and regeneration of a waste lithium cobaltate material according to claim 1, wherein in step (3), the calcining is performed at a temperature of 800-1100° C. for 10-20 hours.

7. The method for preparing a high-voltage cathode material by body modification and regeneration of a waste lithium cobaltate material according to claim 1, wherein in step (4), the aluminum source is aluminium isopropoxide or aluminum tri-sec-butoxide; a mass-volume ratio of the aluminum source to absolute ethanol is in a range of (0.08-4) g:1000 mL.

8. The method for preparing a high-voltage cathode material by body modification and regeneration of a waste lithium cobaltate material according to claim 1, wherein in step (4), a mass-volume ratio of the magnesium-titanium co-doped regenerated lithium cobaltate cathode material to the mixed solution is in a range of (0.02-0.04) g:1 mL.

9. The method for preparing a high-voltage cathode material by body modification and regeneration of a waste lithium cobaltate material according to claim 1, wherein in step (4), the heating and stirring are performed at a temperature of 40-70° C.

10. The method for preparing a high-voltage cathode material by body modification and regeneration of a waste lithium cobaltate material according to claim 1, wherein in step (5), the calcining is performed at a temperature of 600-900° C. for 2-6 hours.

* * * * *